(12) United States Patent
Nakai et al.

(10) Patent No.: US 7,989,107 B2
(45) Date of Patent: Aug. 2, 2011

(54) LITHIUM-ION SECONDARY BATTERY

(75) Inventors: Kenji Nakai, Hitachinaka (JP); Akinori Tada, Hitachinaka (JP); Seiichi Sato, Hitachinaka (JP); Masatsugu Arai, Hitachinaka (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 672 days.

(21) Appl. No.: 12/057,347

(22) Filed: Mar. 27, 2008

(65) Prior Publication Data

US 2008/0305393 A1 Dec. 11, 2008

(30) Foreign Application Priority Data

Jun. 11, 2007 (JP) ................................. 2007-153472

(51) Int. Cl.
*H01M 4/02* (2006.01)
*H01M 4/13* (2010.01)
*H01M 2/16* (2006.01)
*H01M 2/18* (2006.01)
*H01M 2/26* (2006.01)
*H01M 2/28* (2006.01)
(52) U.S. Cl. .......... 429/211; 429/143; 429/147; 429/161
(58) Field of Classification Search .................. 429/209, 429/211, 231.95, 161, 143, 147
See application file for complete search history.

(56) References Cited

U.S. PATENT DOCUMENTS 6,040,086 A * 3/2000 Yoshida et al. ............... 429/211
(Continued)

FOREIGN PATENT DOCUMENTS

EP 1 076 371 A1 2/2001
(Continued)

OTHER PUBLICATIONS

Office Action issued by U.S. Patent and Trademark Office dated Mar. 16, 2010 in U.S. Appl. No. 12/018,619.
(Continued)

*Primary Examiner* — Patrick Ryan
*Assistant Examiner* — Julian Mercado
(74) *Attorney, Agent, or Firm* — Roberts, Mlotkowski, Safran & Cole, P.C.

(57) ABSTRACT

A lithium-ion secondary battery where a current collecting member and a foil are joined to each other securely while damage of the foil is suppressed is provided. The lithium-ion secondary battery is provided with a winding group obtained by winding a positive electrode plate and a negative electrode plate via a separator. An end portion of a positive electrode mixture non-application portion and an end portion of a negative electrode mixture non-application portion project at an upper portion and a lower portion of the winding group, respectively. Current collecting disks 7 are disposed so as to face both end faces of the winding group, respectively. The current collecting disk 7 has projecting ridge portions 8 on a face thereof opposite to the winding group and flat face portions facing the winding group at positions corresponding to the projecting ridge portions 8. The projecting ridge portions 8 are formed radially. The end portion of the positive electrode mixture non-application portion and the end portion of the negative electrode mixture non-application portion are caused to abut on the flat face portions of the current collecting disks 7 and joining is performed by irradiating the projecting ridge portions 8 with laser beam. The flat face portions of the current collecting disks 7 abut on the end portion of the positive electrode mixture non-application portion and the end portion of the negative electrode mixture non-application portion approximately evenly.

12 Claims, 7 Drawing Sheets

U.S. PATENT DOCUMENTS

| | | |
|---|---|---|
| 2004/0023107 A1 | 2/2004 | Nakanishi et al. |
| 2004/0191625 A1 | 9/2004 | Kojima |
| 2005/0277020 A1 | 12/2005 | Cheon et al. |
| 2006/0204841 A1 | 9/2006 | Satoh et al. |
| 2006/0234120 A1 | 10/2006 | Hamasaki et al. |

FOREIGN PATENT DOCUMENTS

| | | |
|---|---|---|
| EP | 1 484 808 A1 | 12/2004 |
| JP | 60-105165 A | 6/1985 |
| JP | 63-013688 A | 1/1988 |
| JP | 2000-58038 A | 2/2000 |
| JP | 2001-283824 A | 10/2001 |
| JP | 2004-119330 A | 4/2004 |
| JP | 2004-172038 A | 6/2004 |
| JP | 2005-142026 A | 6/2005 |
| JP | 2008-192315 A | 8/2008 |
| WO | 01/89007 A2 | 11/2001 |

OTHER PUBLICATIONS

European Search Report dated Jun. 5, 2009 issued in European Patent Application No. EP 08 00 1206.

European Search Report dated Oct. 20, 2008 issued in corresponding European Patent Application No. EP 08 15 3469.

Communication issued by European Patent Office dated Jun. 30, 2009 issued in corresponding European Patent Application No. EP 08 15 3469.

Office Action issued by Japanese Patent Office dated Oct. 6, 2009 in corresponding Japanese Patent Application No. 2007-153472.

Office Action issued by Chinese Patent Office in corresponding Chinese Patent Application No. 2008100886318, (2009).

English Translation of Office Action issued by Japanese Patent Office in Japanese Patent Application No. 2007-22141, Drafted on Jul. 14, 2009.

English Translation of Office Action issued by Chinese Patent Office in Chinese Patent Application No. 2008100085381, May 8, 2009.

\* cited by examiner

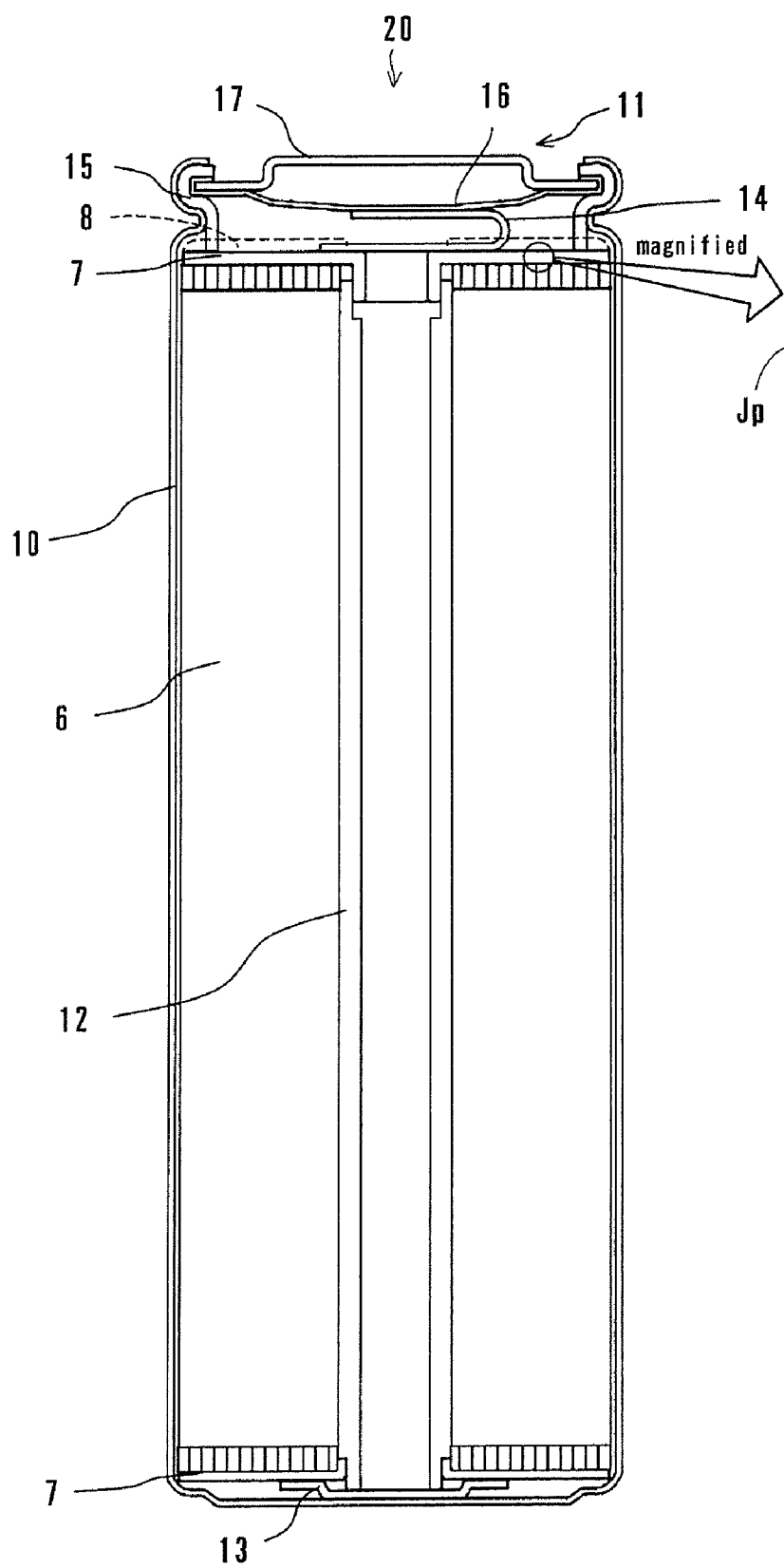
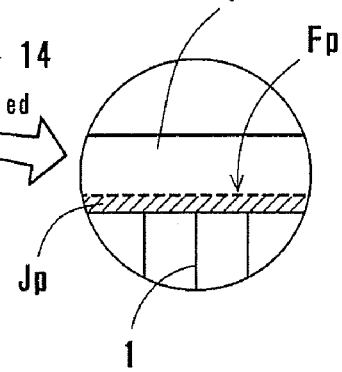
Fig.1A
Fig.1B

LITHIUM-ION SECONDARY BATTERY

FIELD OF THE INVENTION

The present invention relates to a lithium-ion secondary battery, and in particular to a lithium-ion secondary battery which is provided with an electrode group where a positive electrode plate obtained by applying positive electrode mixture mainly including positive electrode active material to a foil body and a negative electrode plate obtained by applying negative electrode mixture mainly including negative electrode active material to a foil body are disposed so as to sandwich a separator, where an end portion of the foil of at least one of the positive electrode plate and the negative electrode plate projects from an end face of the electrode group, a current collecting member for collecting current extending from at least one of the foils is disposed so as to face an end face of the electrode group, and a joint portion obtained by joining the current collecting member and an end portion of the foil is formed so as to project from a face of the current collecting member facing the electrode group.

DESCRIPTION OF THE RELATED ART

As a lithium-ion secondary battery representing a lithium secondary battery has high capacity and high energy density, it draws attention as a power source for an electric vehicle or a hybrid vehicle addressing an environmental problem or a battery for an electric power tool. Since the electric vehicle is required to have a high acceleration performance, a high hill-climbing performance, and the like, a lithium-ion secondary battery with a high-rate orientation coping with large current charging/discharging is required as a battery for a power source for the vehicle. In such a battery with a high-rate orientation, it is important to reduce an internal resistance in order to improve output performance.

In the lithium-ion secondary battery, generally, positive and negative electrode plates are obtained by applying mixtures containing active material to respective current collectors and electrons generated due to reaction of the active material are collected from the current collector to a current collecting member to be taken out of the battery. As the current collector, a foil body, a film, or a perforated plated made from metal having electrical conductivity or the like is used, but it is common to use the foil body in view of energy density or the like. In order to collect electrons from the foil body to the current collecting member, a technique of working an end portion of the foil body to a strip comb shape and connecting the end portion to the current collecting member or a technique of performing connection between the foil and the current collecting member using current collecting taps attached to the foil body is adopted. For example, JP-A-2001-283824 discloses a technique of attaching a plurality of current collecting tabs to a foil body and connecting end portions of the current collecting tabs to a current collecting member which also serves as an external terminal in a collecting manner.

However, the technique of performing working for formation of a strip comb shape to a foil body or a technique of attaching current collecting tabs to a current collecting member requires much time for the working or the attaching, which results in lowering of a manufacturing efficiency at an industrial mass production time. Since working for formation of a strip comb shape is performed, such a problem arises that a portion or margin of the current collecting member to be discarded increases. When a winding group is manufactured by winding positive and negative electrode plates via a separator using such a foil body, strip comb shape end portions or current collecting tabs are expanded radially due to a rotation centrifugal force at a winding time so that the current collecting tabs or the like may be bit by the winding group. As a result, insulation between the positive and negative electrode plates is damaged to cause short-circuiting, which results in so-called process defect. Further, the current collecting tabs or the like is bent so as to cover an end face of the electrode group to be connected to a side edge of the current collecting member, which results in prevention of circulation of electrolyte. As a result, a time required for electrolyte pouring is prolonged (preparing lead time increases), which results in a factor leading to increase of manufacturing cost. In order to solve these problem, for example, JP-A-2004-172038 discloses a technique of welding a current collecting member and a foil body by bringing a projection ridge portion on one face of a current collecting member formed on both faces thereof with projecting ridge portions in contact with an end edge of a foil body disposed in a layered manner to irradiate the projecting ridge portion on the other face with energy ray.

In the technique disclosed in JP-A-2004-172038, however, since the working for formation of a strip comb shape or the current collecting tab is not required, the problem about a time required for the abovementioned working does not occur, but since the projecting ridge portions are formed on both faces of the current collecting member, a melted portion formed by welding becomes excessively large. Reduction of an internal resistance is expected owing to increase of a volume of a joined portion between the foil body and the current collecting member, but damage of the separator or short-circuiting between the positive and negative electrode plates may be caused, and since a melted portion is formed even on a portion where the foil body does not contact with the current collecting member, welding of an excessive volume portion is forced. Since the current collecting member disposed on the end face of the electrode group is joined to the end portion of the foil body, joining work is relatively simple and improvement in working efficiency is expected, but since a difference in thickness between the foil body and the current collecting member is too large, such a problem occurs that it is difficult to join them with low electric resistance. Since such an influence as increase of the internal resistance or lowering of reliability may become large due to the current collecting structure or the situation of the current collecting portion, it is important to secure performance quality or reliability considering industrial mass production, especially, in the lithium-ion secondary battery with high-rate orientation.

SUMMARY OF THE INVENTION

In view of these circumstances, an object of the present invention is to provide a lithium-ion secondary battery where damage of a foil is suppressed and a current collecting member and the foil are joined to each other securely.

In order to solve the problem, according to an aspect of the present invention, there is provided a lithium-ion secondary battery which is provided with a electrode group where a positive electrode plate obtained by applying positive electrode mixture mainly including positive electrode active material to a foil and a negative electrode plate obtained by applying negative electrode mixture mainly including negative electrode active material to a foil are disposed so as to sandwich a separator, where an end portion of the foil of at least one of the positive electrode plate and the negative electrode plate projects from an end face of the electrode group, a current collecting member for collecting current from the foil of said at least one is disposed so as to face the end face of the electrode group, and a joint portion obtained by joining the current collecting member and an end portion of the foil is formed so as to project from a face of the current collecting member which faces the electrode group, wherein the current collecting member includes a plurality of projecting ridge portions extending from a central portion of the current collecting member toward an outer edge portion thereof on a face thereof positioned on the side opposite to the electrode group and flat portions facing the electrode group and provided at positions corresponding to the projecting ridge portions, and the joint portion is formed by causing the end portion of the foil to abut on the flat portions and melting the projecting ridge portions to cause the melted projecting ridge portions to project from the flat portions.

In the present invention, since the current collecting member includes the plurality of projecting portions extending from the central portion to the outer edge portion on the face thereof positioned on the side opposite to the electrode group and the flat portions facing the electrode group and provided at positions corresponding to the projecting ridge portions, and the joint portion between the current collecting member and the end portion of the foil is formed by causing the end portion of the foil to abut on the flat portions of the current collecting member and melting the projecting ridge portions to cause them to project from the flat portions, the flat portions of the current collecting member abut on the end portion of the foil approximately evenly, so that the current collecting member and the end portion of the foil can be joined to each other without damaging the foil.

In the present invention, the projecting ridge portion extends in a straight manner or a curved manner and it may take on an approximately trapezoidal shape in section. It is preferable that, when a projecting height of the projecting ridge portion is represented as H, a width of a base portion thereof is represented as W2, and a thickness of the current collecting member is represented as t, the current collecting member satisfies a relationship of $H \geq W2$ and $H > t$. A pair of grooves may be formed on both sides of the projecting ridge portion on the current collecting member so as to extend along the projecting ridge portion. At this time, it is preferable that, when a projecting height of the projecting ridge portion is represented as H, a width of a base portion of the projecting ridge portion is represented as W2, a thickness of the current collecting member is represented as T, a thickness of a portion on which the groove of the current collecting member is represented as t, and respective groove widths of grooves of a pair of grooves are represented as L1 and L2, the current collecting member satisfies the relationship of $H \geq W2$, $H > t$, $H + t > T$, and $L1 + L2 \geq W2$. The material for the current collecting member and the material for the foil joined to the current collecting member may be the same. The joint portion between the current collecting member and the end portion of the foil can be formed by irradiating the projecting ridge portion of the current collecting member with laser beam. It is preferable that a width of the distal end portion of the projecting ridge portion on the current collecting member is larger than a focal spot diameter of the laser beam. Such a configuration can be adopted that the foil whose end portion projects from the end face of the electrode group is formed on its one side edge with a non-application portion of the positive electrode mixture or the negative electrode mixture, at least a portion of the non-application portion projects from the end edge of the separator, and an end portion of the non-application portion projects from the end face of the electrode group. Such a configuration may be adopted in the joint portion between the current collecting member and the end portion of the foil that the end portion of the foil is melted and integrated into a melted portion obtained by melting the projecting ridge portion and a portion of the current collecting member by irradiation of laser beam.

According to the present invention, since the current collecting member includes a plurality of projecting ridge portions provided on a face thereof opposite to the electrode group so as to extend from a central portion toward an outer edge potion and flat portions facing the electrode group and provided at positions corresponding to the projecting ridge portions, and the joint portion between the current collecting member and the end portion of the foil is formed by causing the end portion of the foil to abut on the flat portions of the current collecting member, melting the projecting ridge portions, and causing the melted portions to project from the flat portions, the flat portions of the current collecting member abut on the end portion of the foil approximately evenly. As a result, such an effect can be obtained that the current collecting member and the end portion of the foil can be joined to each other securely without damaging the foil.

BRIEF DESCRIPTION OF THE DRAWINGS

FIG. 1A is a sectional view schematically showing a cylindrical lithium-ion secondary battery according to an embodiment where the present invention is applied, and FIG. 1B is an enlargement of the circled portion of FIG. 1A;

DETAILED DESCRIPTION OF THE PREFERRED EMBODIMENTS

An embodiment of a cylindrical lithium-ion secondary battery to which the present invention has been applied will be explained below with reference to the drawings.

As shown in FIG. 1A, a cylindrical lithium-ion secondary battery 20 according to the embodiment includes a winding group 6 serving as an electrode group obtained by winding a positive electrode plate and a negative electrode plate in a spiral shape in section such that these plates face each other through a separator. The winding group 6 is accommodated in a battery container 10 formed with an opening portion at its top portion.

Figure 4:
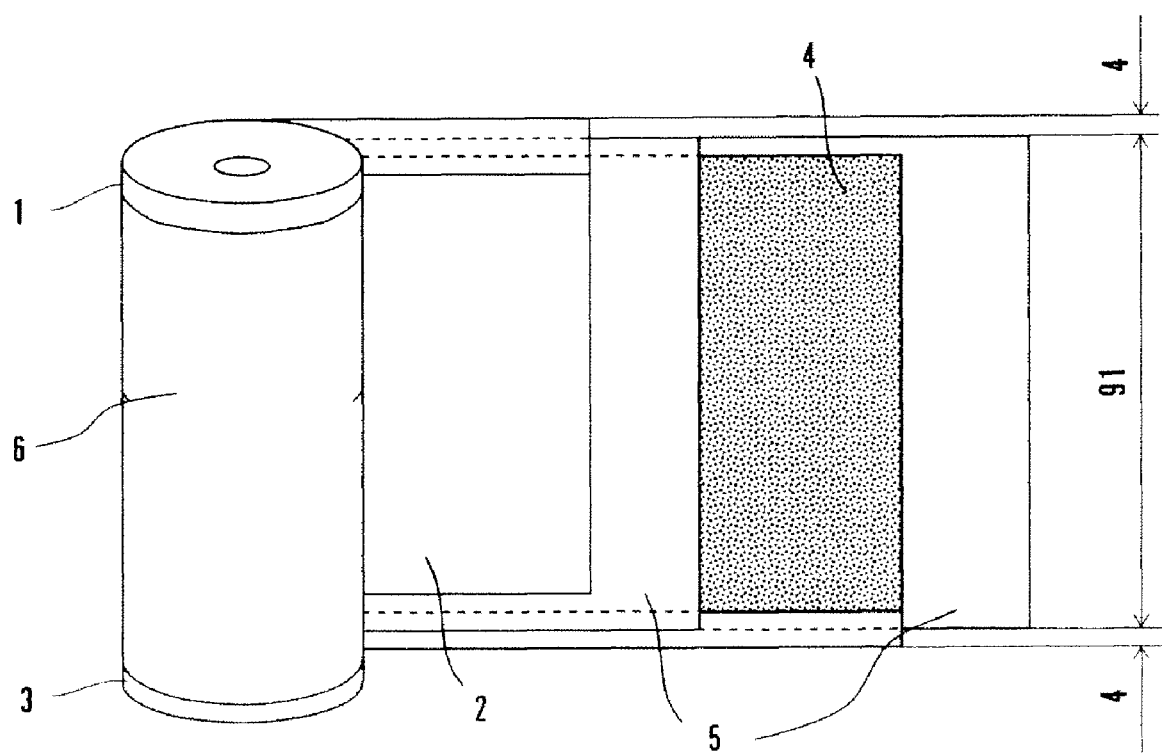
FIG. 4 is an explanatory diagram illustratively showing a positional relationship among the positive electrode plate, the negative electrode plate, and a separator configuring a winding group of the cylindrical lithium-ion secondary battery.

A cylindrical hollow shaft core 12 made from polypropylene is positioned at a winding center of the winding group 6. As shown in FIG. 4, in the winding group 6, a positive electrode plate 2 and a negative electrode plate 4 are superimposed on each other via a separator 5 made from polyethylene or the like such that they do not directly contact with each other and they are wound around the shaft core 12 (the shaft core 12 is not shown in FIG. 4). The separator 5 is set such that its thickness is 30 µm and its width (a length of the shaft core 12 in a longitudinal direction thereof) is 91 mm. The positive electrode plate 2, the negative electrode plate 4, and the separator 5 are superimposed such that a positive electrode mixture non-application portion 1 (a portion of a foil) formed on the positive electrode plate 2 and a negative electrode mixture non-application portion 3 (a portion of a foil) formed on the negative electrode plate 4 are positioned on both end faces of the winding group 6 opposed to each other. The positive electrode mixture non-application portion 1 and the negative electrode mixture non-application portion 3 are disposed at positions running over an end edge of the separator 5 by 2 mm, respectively.

In the winding group 6, at least one portions of the positive electrode mixture non-application portion 1 and the negative electrode mixture non-application portion 3 project from end edges of the separator 5 and the projecting portions project from both end faces of the winding group 6, respectively. That is, an aluminum foil of the positive electrode current collector configuring the positive electrode plate 2 projects at an upper portion of the winding group 6 in a layered manner, and a rolled copper foil of the negative electrode current collector configuring the negative electrode plate 4 projects at a lower portion of the winding group 6 in a layered manner. By adjusting lengths of the positive electrode plate 2, the negative electrode plate 4, and the separator 5, an outer diameter (as a diameter) of the winding group 6 is adjusted to 38±0.1 mm. An inner diameter (as a diameter) of the winding group 6 becomes 9 mm equal to an outer diameter of the shaft core 12. As adhesive tape obtained by applying adhesive made from hexameta-acrylate or the like on one face of a base member made from polyimide is applied to a whole peripheral face of the winding group 6 such that the winding group 6 does not uncoil, and a terminal end portion of winding of the winding group 6 is fixed. In the winding group 6, both of the positive electrode plate 2 and the negative electrode plate 4 are wound in a layer shape by 50 windings, namely, a winding body with 50 layers is formed.

As shown in FIG. 1A, a current collecting disk 7 made from aluminum and serving as a current collecting member for collecting potential from the positive electrode plate is disposed above the winding group 6, while a current collecting disk 7 made from copper and serving as a current collecting member for collecting potential from the negative electrode plate is disposed below the winding group 6. That is, the current collecting disks 7 are disposed such that they face both end faces of the winding group 6, and the same materials as the foil (current collector) configuring the positive electrode plate and the foil (current collector) configuring the negative electrode plate are used as materials for the respective current collecting disks 7. Both the current collecting disks 7 on the positive side and the negative side are formed to have the same shape.

Figure 5A:
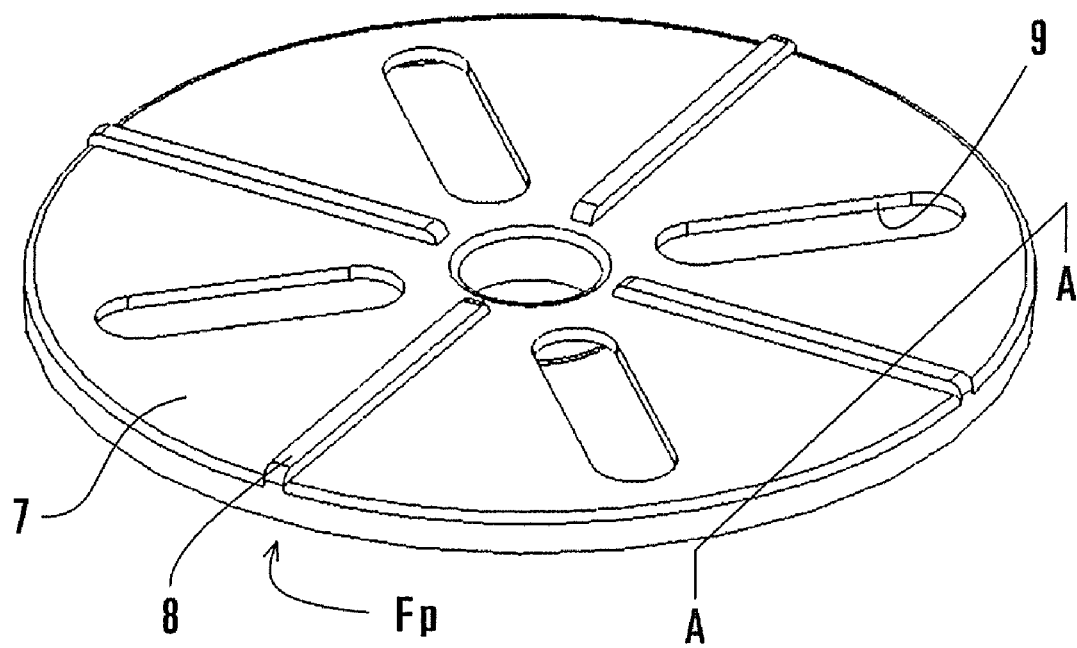
FIGS. 5A and 5B are perspective views of current collecting disks used in the cylindrical lithium-ion secondary battery, FIG. 5A showing a current collecting disk having a projecting ridge portions and FIG. 5B showing a current collecting disk where a pair of grooves are formed on both sides of a projecting ridge portion.
Figure 6A:
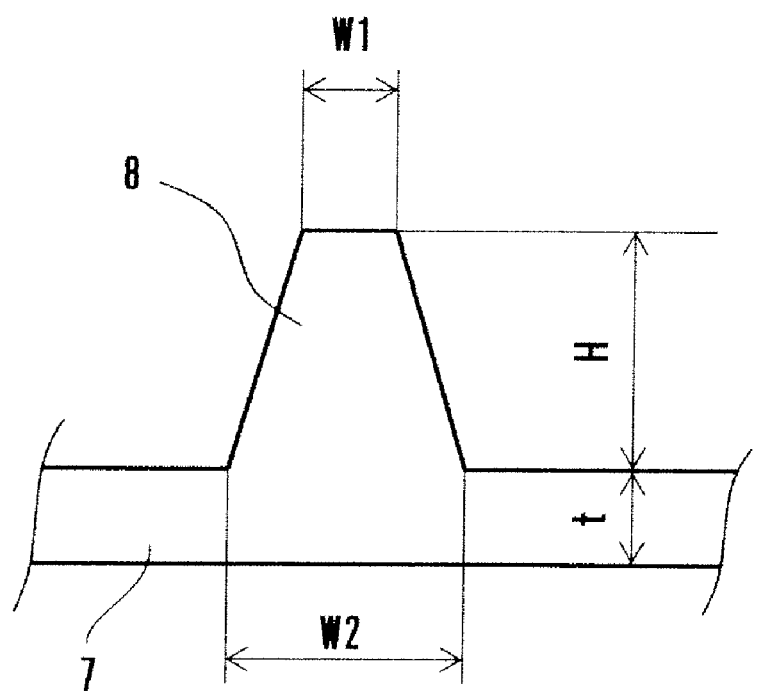
FIGS. 6A and 6B are sectional views showing shapes of projecting ridge portions of disks, FIG. 6A being a sectional view of the current collecting disk, taken along line A-A in FIG. 5A and FIG. 6B being a sectional view of the current collecting disk, taken along line B-B in FIG. 5B.
Figure 6B:
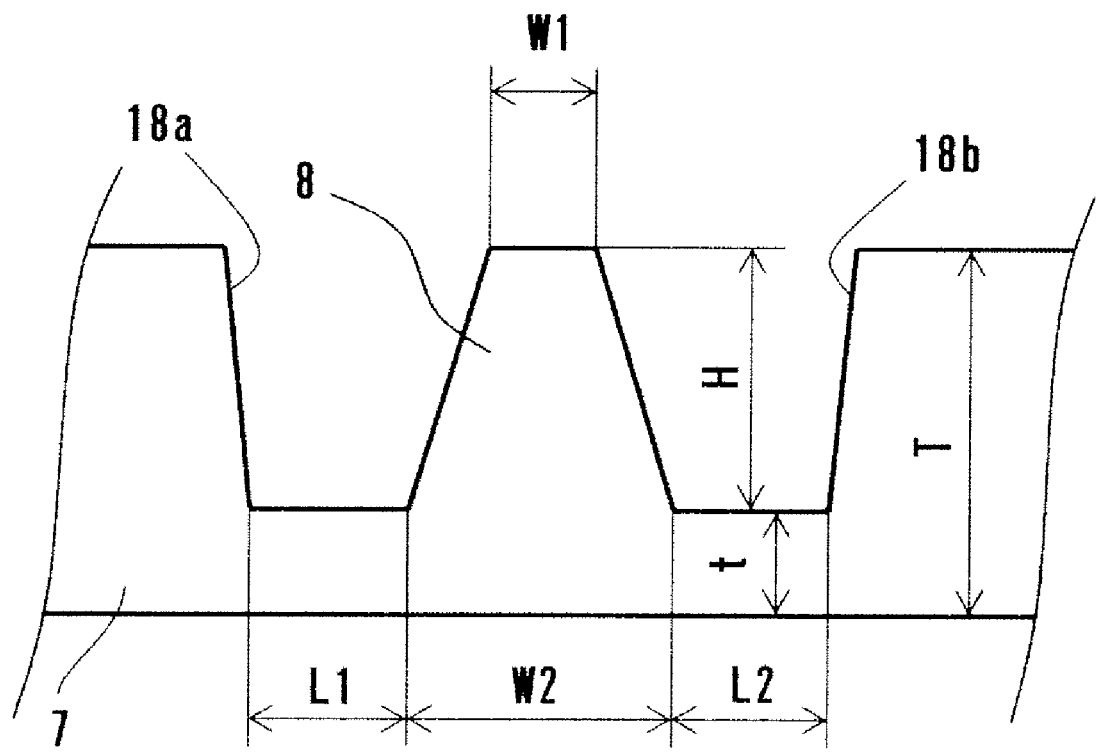

As shown in FIG. 5A, the current collecting disk 7 is set such that its diameter is 38.5 mm in this embodiment. A cylindrical projecting portion for fixation to the shaft core 12 on the winding group 6 side is formed at a central portion of the current collecting disk 7 (also see FIG. 1). The current collecting disk 7 has projecting ridge portions 8 with a trapezoid in section on one face thereof opposite to the winding group 6 and flat face portions Fp at positions thereof facing the winding group 6 and corresponding to the projecting ridge portions 8. The projecting ridge portions 8 are formed radially at four portions on the current collecting disk 7 so as to extend along radial directions of the current collecting disk 7. That is, the projecting ridge portions 8 are provided so as to extend from a central portion of the current collecting disk 7 toward an outer edge portion thereof. As shown in FIG. 6A, a dimension of each projecting ridge portion 8 is set such that, when a thickness of the current collecting disk 7 is represented as t, a width of an upper base (a width of a distal end portion of a trapezoid) is represented as W1, a width of a lower base (a width of a proximal portion of a trapezoid) is represented as W2, and a projecting height is represented as H, a relationship of H.gtoreq.W2 and H>t is satisfied. A length of the projecting ridge portion 8 (a length of the current collecting disk 7 in a radial direction thereof) is set so as to correspond to a range from a center side position to an outer peripheral side portion of the aluminum foil (the rolled copper foil projecting at the lower portion of the winding group 6 on the negative electrode side) projecting at the upper side of the winding group 6. In other words, the projecting ridge portion 8 is formed so as to correspond to a position or range from an innermost periphery (except for the shaft core 12) up to an outermost periphery of the winding group 6.

A plurality of slits 9 serving as flow passages for nonaqueous electrolyte at a pouring time of nonaqueous electrolyte in a battery manufacturing process is formed in portions of the current collecting disk 7 which do not have the projecting ridge portions 8, namely, fan-shaped portions between the projecting ridge portions 8 adjacent to each other. The slits 9, each being overlain so as to extend in a radial direction of the current collecting disk 7, are formed at four portions on the current collecting disk 7.

As shown in FIGS. 1A and 1B, the current collecting disks 7 on the positive electrode side and the negative electrode side are fixed to an upper end portion and a lower end portion of the shaft core 12 at the cylindrical projecting portions formed at the central portions. On the positive electrode side, an end portion of the positive electrode mixture non-application portion 1 (the aluminum foil) projecting at the upper portion of the winding group 6 is caused to abut on the lower face of the current collecting disk 7 and the projecting ridge portions 8 are melted by laser welding to be caused to project from the flat portions Fp so that joining is performed at a plurality of joint portions Jp. On the other hand, on the negative electrode side, an end portion of the negative electrode mixture non-application portion 3 (the rolled copper foil) projecting at the lower portion of the winding group 6 is caused to about the upper face of the current collecting disk 7 and the projecting ridge portions 8 are melted by laser welding to be caused to project from the flat face portions so that joining is performed at a plurality of joint portions. The joint portions Jp between the positive electrode mixture non-application portion 1 and the current collecting disk 7 and the joint portions between the negative electrode mixture non-application portion 3 and the current collecting disk 7 are formed so as to project from faces of the current collecting disks 7 facing the winding group 7 both on the positive electrode side and the negative electrode side.

A disk-like upper lid 11 which also serving as a positive electrode external terminal is disposed above the current collecting disk 7 on the positive electrode side. One end of a positive electrode lead 14 made from aluminum with a thickness of 0.3 mm and a width of 16 mm is welded to a central portion upper face of the current collecting disk 7. The other end of the positive electrode lead 14 is joined to a lower face of a disk 16 configuring the upper lid 11 by laser welding. On the other hand, a disk-like negative electrode lead 13 with a thickness of 0.5 mm made from nickel whose central portion projects on the side opposite to the winding group 6 is disposed below the current collecting disk 7 on the negative electrode side. An outer peripheral portion upper face of the negative electrode lead 13 is joined to a lower face of the current collecting disk 7 by ultrasonic welding. A central portion lower face of the negative electrode lead 13 is joined to an inner bottom face of a battery container 10 which also serves as a negative electrode external terminal by resistive welding. As the battery container 10, a cylindrical container with a bottom made from iron and nickel-plated is used. In the embodiment, a thickness of the container is set to 0.5 m. Incidentally, the battery container 10 is irradiated with laser beam from outside of a bottom face of the container so that the number of welded portion between the negative electrode lead 13 and the battery container 10 is increased.

Figure 8:
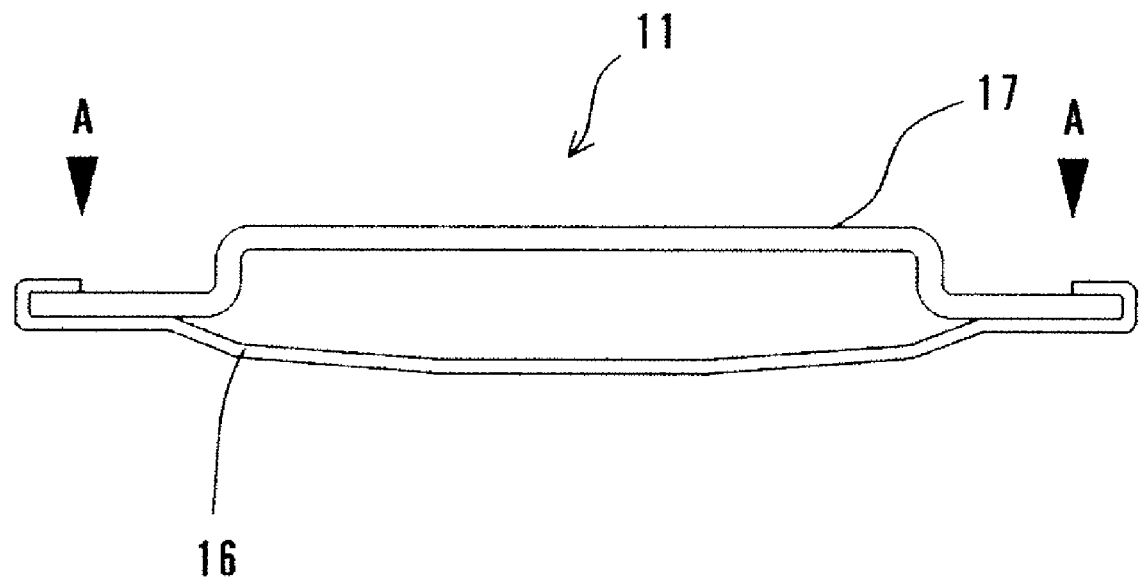
FIG. 8 is a sectional view of an upper lid configuring the cylindrical lithium-ion secondary battery.

As shown in FIG. 8, the upper lid 11 comprises a cap 17 made from aluminum and a disk 16 made from aluminum. A central portion of the cap 17 projects on the side opposite to the winding group 6 (outside the battery) and a thickness of the cap 17 is set to 1 mm in the embodiment. The disk 16 is formed so as to cover the opening portion of the battery container 10 and it takes on such a dish shape that its central portion projects toward the winding group 6. A thickness of the disk 16 is set to 0.5 mm in the embodiment. An entire outer peripheral portion of the disk 16 is folded back to the upper face side of an outer peripheral portion of the cap 17. Laser welding is applied to the whole circumference of the outer peripheral portion from the folded-back upper face side toward the folded-back portion (in a direction of black arrow A in FIG. 8).

As shown in FIG. 1, the upper lid 11 is fixed to the upper opening portion of the battery container 10 via a gasket 15 made from polypropylene in a crimping manner. Therefore, the battery container is enclosed and sealed by the upper lid 11. Nonaqueous electrolyte is poured into the battery container 10. As the nonaqueous electrolyte, solution obtained by dissolving lithium phosphate hexafluoride ($LiPF_6$) into mixed solution including ethylene carbonate and dimethyl carbonate at a volume ratio of 2:3 at 1 mol/litter is used.

Figure 2:
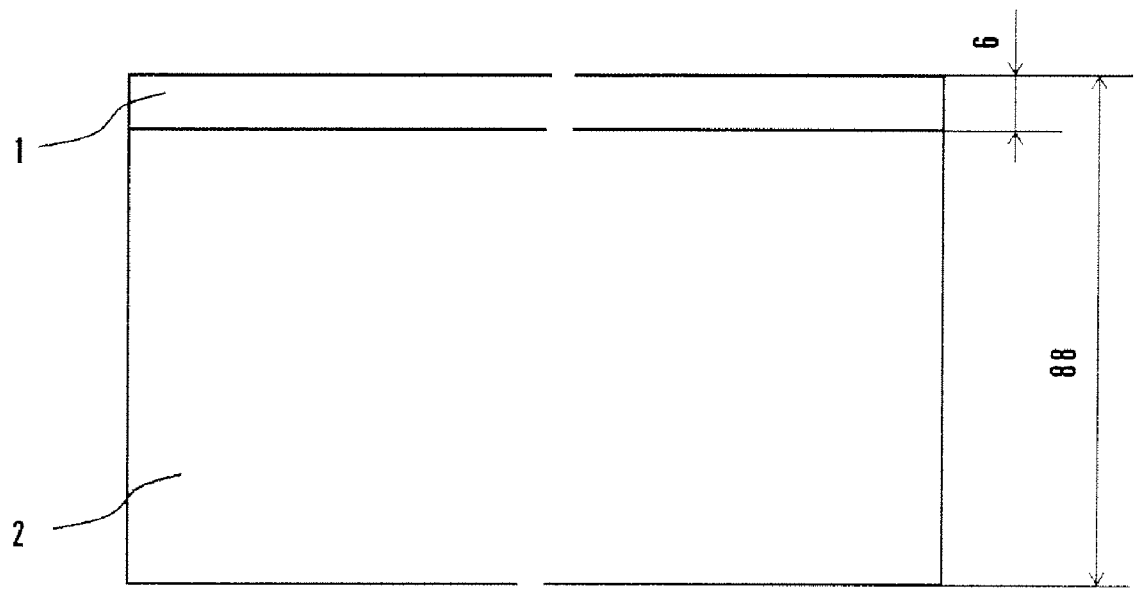
FIG. 2 is a plan view illustratively showing a positive electrode plate configuring the cylindrical lithium-ion secondary battery according to the embodiment.

As shown in FIG. 2, the positive electrode plate 2 configuring the winding group 6 has an aluminum foil as a foil configuring the positive electrode plate. A thickness of the aluminum foil is set to 20 μm in the embodiment. Positive electrode mixture including positive electrode active material is applied to both faces of the aluminum foil approximately evenly. As the positive electrode active material, for example, powder of lithium transition metal double oxide such as lithium manganate expressed by chemical formula $LiMn_2O_4$ is used. The positive electrode mixture is obtained by blending positive electrode active material, graphite powder serving as primary conductive material, acetylene black serving as secondary conductive material, and polyvinylidene-fluoride (hereinafter, abbreviated "PVDF") serving as binder, for example, at a mass ratio of 85:8:2:5. Slurry is prepared by adjusting the viscosity of the positive electrode mixture using disperse medium such as N-methyl-2-pyrolidene (hereinafter, abbreviated "NMP") at an application time of the positive electrode mixture to the aluminum foil. After dried, the positive electrode plate 2 is pressed to be formed in a strip with a width of 88 mm. A positive electrode mixture non-application portion 1 with a width of 6 mm is formed on a side edge of the aluminum foil in a longitudinal direction thereof. As described above, since the positive electrode mixture non-application portion 1 is disposed at a position running over an end edge of the separator 5 by 2 mm at a manufacturing time of the winding group 6, a portion of the positive electrode mixture non-application portion 1 projects from an end face of the winding group 6.

Figure 3:
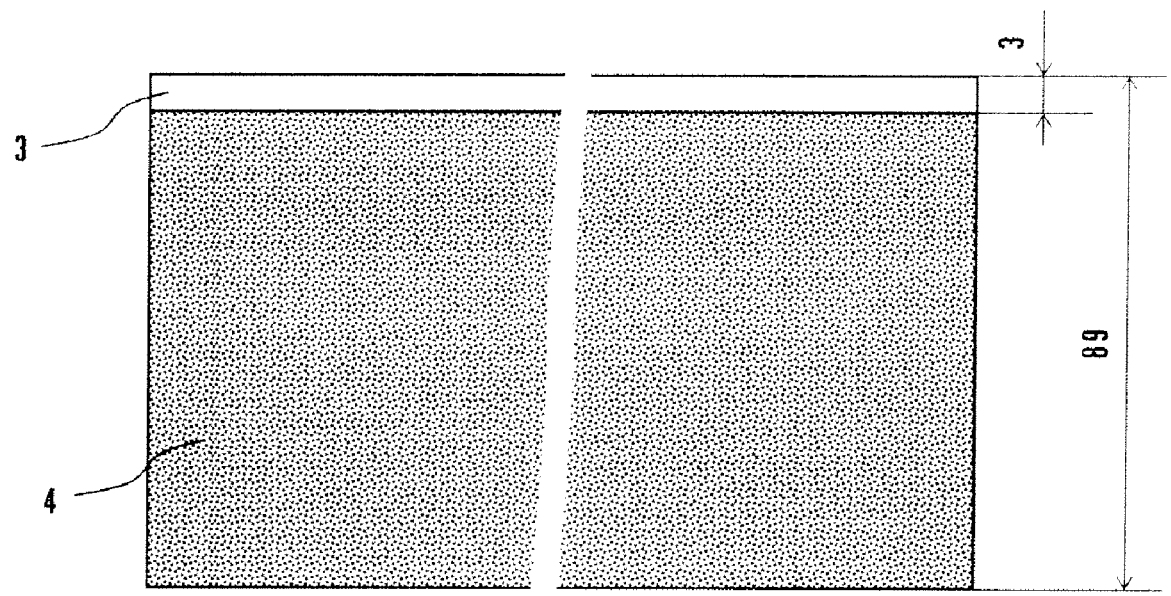
FIG. 3 is a plan view illustratively showing a negative electrode plate configuring the cylindrical lithium-ion secondary battery according to the embodiment.

On the other hand, as shown in FIG. 3, the negative electrode plate 4 has a rolled copper foil as a foil configuring the negative electrode plate. A thickness of the rolled copper foil is set to 20 μm in the embodiment. Negative electrode mixture including powder of carbon material such as graphitizable carbon which can store and discharge lithium ion reversibly as the negative electrode active material is approximately evenly applied to both faces of the rolled copper foil. The negative electrode mixture is prepared by blending PVDF of 8 mass parts to graphitizable carbon powder of 92 mass parts, for example. Slurry is prepared by adjusting the viscosity of the negative electrode mixture using disperse medium such as NMP at an application time of the negative electrode mixture to the rolled copper foil. After dried, the negative electrode plate 4 is pressed to be formed in a strip with a width of 89 mm. A negative electrode mixture non-application portion 3 with a width of 3 mm is formed on a side edge of the rolled copper foil in a longitudinal direction thereof like the positive electrode plate 2. As described above, since the negative electrode mixture non-application portion 3 is disposed at a position running over an end edge of the separator 5 by 2 mm, a portion of the negative electrode mixture non-application portion 3 projects from an end face of the winding group 6. Incidentally, an application amount of the negative electrode active material to the rolled copper foil is adjusted such that a ratio of an amount of lithium ion discharged from the positive electrode plate 2 at an initial charging time to an amount of lithium ion stored in the negative electrode plate 4 at the initial charging time is 1:1.

(Assembling of Battery)

The lithium-ion secondary battery 20 is assembled in the following manner. First, the current collecting disk 7 is placed on an upper end face of the winding group 6, and flat face portions of the current collecting disk 7 is caused to abut on an end portion of the positive electrode mixture non-application portion 1 positioned on an upper end face of the winding group 6. Each projecting ridge portion 8 is irradiated with laser beam along the longitudinal direction of the projecting ridge portion 8 (radial direction of the current collecting disk 7) from above the projecting ridge portions 8 (from above the current collecting disk 7). At this time, a focal spot diameter of laser beam is set to be smaller than the upper base width W1 of the projecting ridge portion 8. The projecting ridge portion 8 and a portion of the current collecting disk 7 are melted by irradiation of laser beam, so that a back face (a flat face portion of the current collecting disk 7) of a laser beam-irradiated face and an end portion of the positive electrode mixture non-application portion 1 of each winding (50 layers) abutting on the back face are joined to each other. That is, when the projecting ridge portion 8 and a portion of the current collecting disk 7 are melted by laser beam irradiation, a melted portion grows down (projects) from a flat face portion of the current collecting disk 7 due to gravity. The melted portion forms a welding locus due to irradiation of laser beam. After irradiation of laser beam, the growing-down portion remains as a melt trail and a portion where the projecting ridge portion 8 has been formed becomes approximately flat. Regarding four projecting ridge portions 8, they are sequentially irradiated with laser beam from upper faces of the projecting ridge portions 8 so that an end portion of the positive electrode mixture non-application portion 1 and the flat face portion of the current collecting disk 7 are welded to each other. Next, regarding the end portion of the negative electrode mixture non-application portion 3 and the current collecting disk 7, they are welded in the same manner as the case of welding between the positive electrode mixture non-application portion 1 and the current collecting disk 7. At this time, welding is performed by reversing the winding group 6 welded with the current collecting disk 7 on the positive electrode side vertically and positioning the negative electrode mixture non-application portion 3 to the upper side.

Here, laser welding will be explained. Since laser welding procedures on the positive electrode side and the negative electrode side are performed in the same manner, only the laser welding procedure on the positive electrode side will be explained. When the projecting ridge portion 8 is irradiated with laser beam from above the projecting ridge portion 8 along the longitudinal direction thereof, the projecting ridge portion 8 and a portion of the current collecting disk 7 are melted and a melted portion grows down from the flat face portion of the lower face of the current collecting disk 7 due to gravity in a semi-circular shape in section. The melted portion is formed so as to correspond to the projecting ridge portion 8 and the melted portion enters between the positive electrode mixture non-application portions 1 of the winding group 6. The melted portion grows down as if it wets both faces of the end portion of the positive electrode mixture non-application portion 1 so that the end portion of the positive electrode mixture non-application portion 1 is melted into the melted portion in a integrated manner. After laser beam irradiation, the growing-down melted portion is cooled and solidified so that melt trail remains. Therefore, the end portion of the positive electrode mixture non-application portion 1 is joined to the current collecting disk 7 at a plurality of portions along the longitudinal direction of the projecting ridge portion 8. The joint portion between the end portion of the positive electrode mixture non-application portion 1 and the current collecting disk 7 is formed so as to project from a face of the current collecting disk 7 facing the winding group 6.

Next, the negative electrode lead 13 is attached to a face of the current collecting disk 7 on the negative electrode side opposite to the winding group 6 by ultrasonic welding. The winding group 6 attached with the negative electrode lead 13 is accommodated in the battery container 10 such that the negative electrode lead 13 is positioned on the bottom face side of the battery container 10. A lower face of the negative electrode lead 13 and the inner bottom face of the battery container 10 are joined to each other by resistance welding. After joint, a bottom face of the battery container 10 is irradiated with laser beam from the outside of the bottom face so that the number of welded portions between the negative electrode lead 13 and the battery container 10 is increased.

One end of the positive electrode lead 14 is then joined to an upper face of the current collecting disk 7 on the positive electrode side by welding, while the other end thereof is joined to a lower face of the disk 16 configuring the upper lid 11 by welding. Next, nonaqueous electrolyte is poured into the battery container 10. A pouring amount of nonaqueous electrolyte is set to 50 g in this embodiment. After pouring the nonaqueous electrolyte, the upper lid 11 is fixed to the opening portion of the battery container 10 through the gasket 15 in a crimping manner to enclose and seal the battery container 10, thereby completing the lithium-ion secondary battery 20.

EXAMPLES

Next, Examples of the lithium-ion secondary battery 20 manufactured according to the embodiment by changing material of the current collecting disk 7, the dimension of the projecting ridge portion 8, and irradiation output at laser welding time will be explained. Incidentally, a lithium-ion secondary battery of Comparative Example manufactured for comparison will be also explained.

In Examples and Comparative Examples, the conditions satisfied when the end portion of the positive electrode mixture non-application portion 1 on the positive electrode side and the end portion of the negative electrode mixture non-application portion 3 on the negative electrode side were joined to the current collecting disk 7 on the positive electrode side and the current collecting disk 7 on the negative electrode side, respectively, were set in the following manner. That is, just focus was applied to an upper face of the projecting ridge portion 8 and both feeding rates of laser spot on the positive electrode side and the negative electrode side were set to 5 m/minute. A focal spot diameter of laser beam was set to 0.1 mm. Irradiation output of laser beam was set such that the projecting ridge portion 8 is melted by irradiation of laser beam and the melted portion grew down, so that an upper face of the projecting ridge portion 8 lowered to approximately the same level as a surrounding face (the upper face of the current collecting disk 7 except for the projecting ridge portion 8) or a level equal to about 20% of the projecting height of the projecting ridge portion 8. When the irradiation output is excessively intense, laser beam penetrates the current collecting disk 7 to melt the aluminum foil or the rolled copper foil down. On the contrary, when the irradiation output is insufficient, the melted portion does not grow down sufficiently so that a welding probability with the aluminum foil or the rolled copper foil lowers. These conditions were obtained experimentally from such a fact that a melted portion due to laser beam irradiation grew down from the lower face of the current collecting disk 7 and the welding with the aluminum foil and the rolled copper foil were proper.

Example 1

In Example 1, material for the current collecting disk 7 on the positive electrode side was aluminum, and material for the current collecting disk 7 on the negative electrode was copper. The irradiation output of laser beam for welding on the positive electrode side was set to 600 W and that for welding on the negative electrode side was set to 550 W. The dimension of the current collecting disk 7 was set to thickness t=0.2 mm, upper base width W1=0.2 mm, lower base width W2=0.8 mm, projecting height H=11.0 mm as shown in the following Table 1. Therefore, the relationship of H≧W2 and H>t was satisfied.

Regarding 10 lithium-ion secondary batteries selected arbitrarily from lithium-ion secondary batteries obtained, 1 kHz AC impedance (1 kHz ACR) was measured. Regarding measurement of 1 kHz AC impedance, after a lithium-ion secondary battery 20 was charged to 4.0V at the room temperature using 2 A constant current, it was subsequently charged using 4.0 constant voltage until current dropped to 0.1 A, and measurement was performed under the condition of an ambient environmental temperature and a battery temperature of 25±0.5° C. (experiments for the other Examples and Comparative Examples were conducted similarly). As shown in the following Table 1, in the lithium-ion secondary battery 20 of Example 1, an average value of 1 kHz AC impedance was 0.21 mΩ.

TABLE 1

| | W1 (mm) | W2 (mm) | H (mm) | t (mm) | T (mm) | L1 L2 (mm) | 1 kHz ACR (mΩ) | Remark |
|---|---|---|---|---|---|---|---|---|
| Example 1 | 0.2 | 0.8 | 1.0 | 0.2 | — | — | 0.21 | |
| Example 2 | 0.4 | 0.8 | 0.8 | 0.7 | — | — | 0.24 | |
| Example 3 | 0.2 | 0.8 | 1.0 | 0.2 | — | — | 0.24 | negative electrode: nickel |
| Example 4 | 0.2 | 0.8 | 1.0 | 0.2 | 1.0 | 1.0 | 0.21 | |
| Example 5 | 0.4 | 0.8 | 0.8 | 0.7 | 1.4 | 0.4 | 0.24 | |
| Example 6 | 0.2 | 0.8 | 1.0 | 0.2 | 1.0 | 1.0 | 0.24 | negative electrode: nickel |
| Example 7 | 0.4 | 1.0 | 0.8 | 1.0 | — | — | 0.28 | |
| Example 8 | 0.4 | 1.0 | 0.8 | 1.0 | 1.6 | 0.4 | 0.28 | |
| Comparative Example 1 | 0.4 | 0.4 | 0.8 | 0.4 | — | — | 0.28 | sputter, blowhole |
| Example 9 | 0.05 | 0.8 | 0.8 | 0.4 | — | — | 0.25 | sputter, blowhole |
| Comparative Example 2 | 0.5 | 0.5 | 0.5 | 0.5 | 1.0 | 0.5 | 0.30 | sputter, blowhole |
| Example 10 | 0.05 | 0.8 | 0.8 | 0.4 | 1.2 | 0.5 | 0.25 | sputter, blowhole |

Example 2

In Example 2, a current collecting disk 7 having the same size and material as those of Example 1 except that Example 2 was different in dimension from Example 1 was used. The dimension of the current collecting disk 7 was set to thickness t=0.7 mm, upper base width W1=0.4 mm, lower base width W2=0.8 mm, and projecting height H=0.8 mm, as shown in Table 1. Therefore, the relationship of H≧W2 and H>t was satisfied. The irradiation output of laser beam for welding on the positive electrode side was set to 650 W, while irradiation output of laser beam for welding on the negative electrode side was 580 W. In a lithium-ion secondary battery 20 in Example 2, an average value of 1 kHz AC impedance was 0.24 mΩ.

Example 3

In Example 3, material on the positive electrode side was aluminum and material on the negative electrode side was nickel, and a current collecting disk 7 having the same shape as that of Example 1 except that Example 3 was different in dimension from Example 1 was used. The dimension of the current collecting disk 7 was set to thickness t=0.2 mm, upper base width W1=0.2 mm, lower base width W2=0.8 mm, and projecting height H=11.0 mm, as shown in Table 1. Therefore, the relationship of H>W2 and H>t was satisfied. The irradiation output of laser beam for welding on the positive electrode side was set to 600 W, while irradiation output of laser beam for welding on the negative electrode side was 450 W. In a lithium-ion secondary battery 20 in Example 3, an average value of 1 kHz AC impedance was 0.24 mΩ.

Example 4

Figure 5B:
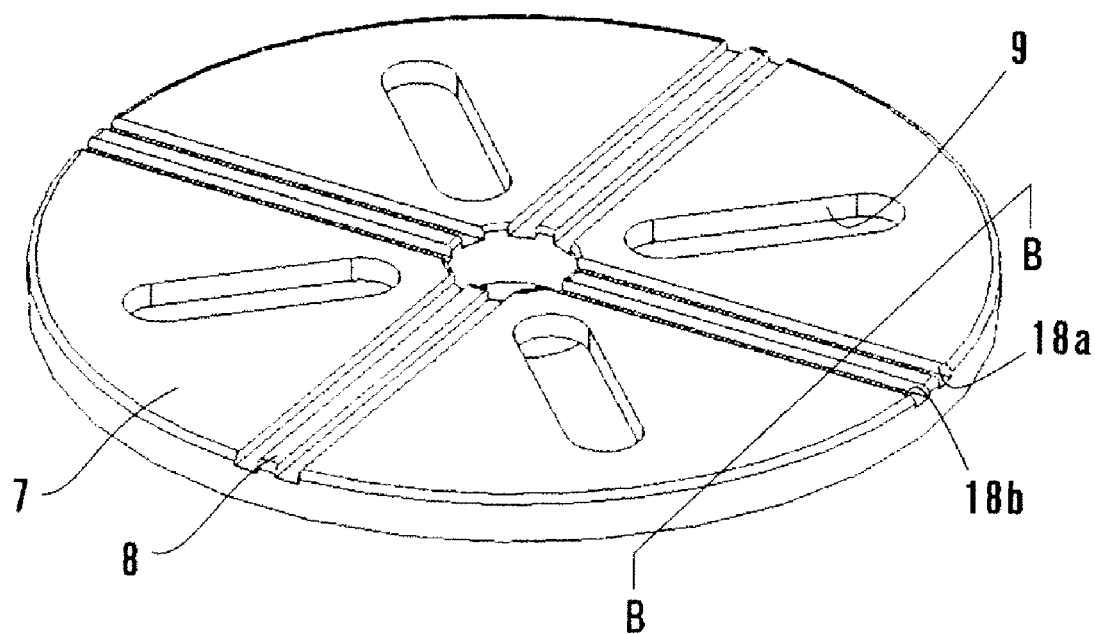

In Example 4, current collecting disks 7 on the positive electrode side and the negative electrode side which were different in shape from those in Example 1 were used. That is, as shown in FIG. 5B, a pair of 18a, 18b were formed on a current collecting disk 7 so as to be positioned on both sides of each projecting ridge portion 8 along the projecting ridge portion 8 (so as to sandwich the projecting ridge portion 8). The grooves 18a, 18b were formed at four portions on the current collecting disk 7 in a paired manner. The current collecting disk 7 had flat portions at portions facing the winding group 6 and corresponding to the grooves 18a, 18b, and projecting ridge portions 8. Setting was performed such that, when the thickness of the current collecting disk 7 was represented as T, the upper base width (width of the distal end portion of the trapezoid) was represented as W1, the lower base width (width of the proximal portion of the trapezoid) was represented as W2, the projecting height was represented as H, the groove width of the groove 18a was represented as L1, the groove width of the groove 18b was represented as L2, the thickness of the current collecting disk 7 where each of the grooves 18a, 18b was formed, corresponding to a position of each groove was represented as t, dimensions of the grooves 18a, 18b and the projecting ridge portion 8 satisfied a relationship of H>W2, H>t, H+t>T, and L1+L2≧W2. A length (lengths of the current collecting disk in a radial direction thereof) of each of the grooves 18a, 18b, and the projecting ridge portion 8 were set so as to correspond to a length from a position of a central side of an aluminum foil projecting upwardly toward the winding group 6 (a rolled copper foil projecting downwardly toward the winding group 6 on the negative electrode side) to a position of an outer peripheral side. In other words, each of the grooves 18a, 18b, and the projecting ridge portion 8 was formed to extend from an innermost periphery to an outermost periphery of the winding group 6 (except for the shaft core 12).

As shown in Table 1, in Example 4, material for current collecting disk 7 on the positive electrode side was aluminum, and that on the negative electrode side was copper. The irradiation output of laser beam for welding on the positive electrode side was 600 W, and that for welding on the negative electrode side was 550 W. The dimension of the current collecting disk 7 was set to thickness T=11.0 mm, disk thickness on groove t=0.2 mm, upper base width W1=0.2 mm, lower base width W2=0.8 mm, projecting height H=11.0 mm, and groove width L1=groove width L2=1.0 mm. Therefore, a relationship of H≧W2, h>t, H+t>T, and L1+L2≧W2 was satisfied. In a lithium-ion secondary battery 20 in Example 4, an average value of 1 kHz AC impedance was 0.21 mΩ.

Example 5

In Example 5, a current collecting disk 7 having the same shape and material as those of Example 4 except that Example 5 was different in dimension from Example 4 was used. The dimension of the current collecting disk 7 was set to thickness T=1.4 mm, disk thickness on groove t=0.7 mm, upper base width W1=0.4 mm, lower base width W2=0.8 mm, projecting height H=0.8 mm, and groove width L1=groove width L2=0.4, as shown in Table 1. Therefore, a relationship of H≧W2, H>t, H+t>T, and L1+L2≧W2 was satisfied. The irradiation output of laser beam on the positive electrode side was 650 W, and that on the negative electrode side was 580 W. In a lithium-ion secondary battery 20 in Example 5, an average value of 1 kHz AC impedance was 0.24 mΩ.

Example 6

In Example 6, material on the positive electrode side was aluminum, material on the negative electrode side was nickel, and a current collecting disk 7 having the same shape as that in Example 4 except that Example 6 was different in dimension from Example 4 was used. The dimension of the current collecting disk 7 is set to thickness T=11.0 mm, disk thickness on groove t=0.2 mm, upper base width W1=0.2 mm, lower base width W2=0.8 mm, projecting height H=1.0 mm, and groove width L1=groove width L2=1.0 mm. Therefore, a relationship of H≧W2, H>t, H+t>T, and L1+L2≧W2 was satisfied. The irradiation output of laser beam on the positive electrode side was 600 W, and that on the negative electrode side was 450 W. In a lithium-ion secondary battery 20 in Example 6, an average value of 1 kHz AC impedance was 0.24 mΩ.

Example 7

In Example 7, a current collecting disk 7 having the same shape and material as those of Example 1 except that Example 7 was different in dimension from Example 1 was used. The dimension of the current collecting disk 7 was set to thickness t=1.0 mm, upper base width W1=0.4 mm, lower base width W2=1.0 mm, and projecting height H=0.8 mm, as shown in Table 1. A relationship of H<W2 and H<t was obtained, which did not satisfy a relationship of H≧W2 and H>t. The irradiation output of laser beam on the positive electrode side was 700 W, and that on the negative electrode side was 610 W. In a lithium-ion secondary battery 20 in Example 7, an average value of 1 kHz AC impedance was 0.28 mΩ.

Example 8

In Example 8, a current collecting disk 7 having the same shape and material as those of Example 4 except that Example 8 was different in dimension from Example 4 was used. The dimension of the current collecting disk 8 was set to thickness T=1.6 mm, disk thickness on groove t=1.0 mm, upper base width W1=0.4 mm, lower base width W2=1.0 mm, projecting height H=0.8 mm, and groove width L1=groove width L2=0.4 mm, as shown in Table 1. Therefore, a relationship of H<W2, H<t, and L1+L2<W2 was obtained. Therefore, a relationship of H+t>T was satisfied, but a relationship of H≧W2, H>t, and L1+L2≧W2 was not satisfied. The irradiation output of laser beam on the positive electrode side was 700 W, and that on the negative electrode side was 610 W. In a lithium-ion secondary battery 20 in Example 8, an average value of 1 kHz AC impedance was 0.28 mΩ.

Comparative Example 1

In Comparative Example 1, a current collecting disk 7 having the same shape and material as those of Example 1 except that Example 7 was different in dimension from Example 1 was used. The dimension of the current collecting disk 7 was set to thickness t=0.4 mm, upper base width W1=0.4 mm, lower base width W2=0.4 mm, and projecting height H=0.8 mm, as shown in Table 1. Therefore, a relationship of H≧W2 and H>t was satisfied but the shape of the projecting ridge portion was rectangular in section. Setting was performed such that the irradiation output of laser beam on the positive electrode side was 600 W, and that on the negative electrode side was 550 W. In a lithium-ion secondary battery in Comparative Example 1, an average value of 1 kHz AC impedance was 0.28 mΩ. A plurality of sputters (scattered molted metals) which were thought to be generated at a welding time adhered to a face of the current collecting disk 7 which was irradiated with laser beam, and a blowhole (a cavity of metal gas) was observed in a section of a welded portion.

Example 9

In Example 9, a current collecting disk 7 having the same shape and material as those of Example 1 except that Example 9 was different in dimension from Example 1 was used. The dimension of the current collecting disk 7 was set to thickness t=0.4 mm, upper base width W1=0.05 mm, lower base width W2=0.8 mm, and projecting height H=0.8 mm, as shown in Table 1. Therefore, a relationship of H≧W2 and H>t was satisfied, but the upper bottom width W1 was smaller than a focal spot diameter (0.1 mm) of laser beam. Setting was performed such that the irradiation output of laser beam on the positive electrode side was 600 W, and that on the negative electrode side was 550 W. In a lithium-ion secondary battery 20 in Example 9, an average value of 1 kHz AC impedance was 0.25 mΩ. A plurality of sputters which were thought to be generated at a welding time adhered to a face of the current collecting disk 7 which was irradiated with laser beam, and a blowhole was observed in a section of a welded portion.

Comparative Example 2

In Comparative Example 2, a current collecting disk 7 having the same shape as that of Example 4 except that Comparative Example 2 was different in dimension from Example 4 was used. The dimension of the current collecting disk 7 was set to thickness T=1.0 mm, disk thickness on groove t=0.5 mm, upper base width W1=0.5 mm, lower base width W2=0.5 mm, projecting height H=0.5 mm, and groove width L1=groove width L2=0.5 mm, as shown in Table 1. Therefore, a relationship of H=t and H+t=T was obtained, and a relationship of H≧W2 and L1+L2>W2 was satisfied, but a relationship of H>t and H+t>T was not satisfied and a shape of the projecting ridge portion in section was rectangular.

Setting was performed such that the irradiation output of laser beam on the positive electrode side was 600 W, and that on the negative electrode side was 550 W. In a lithium-ion secondary battery in Comparative Example 2, an average value of 1 kHz AC impedance was 0.30 mΩ. A plurality of sputters which were thought to be generated at a welding time adhered to a face of the current collecting disk 7 which was irradiated with laser beam, and a blowhole was observed in a section of a welded portion. Further, meltdown was observed in some of aluminum foils and rolled copper foils Example 10

In Example 10, a current collecting disk 7 having the same shape as that of Example 4 except that Example 10 was different in dimension from Example 4 was used. The dimension of the current collecting disk 7 was set to thickness T=1.2 mm, disk thickness on groove t=0.4 mm, upper base width W1=0.05 mm, lower base width W2=0.8 mm, projecting height H=0.8 mm, and groove width L1=groove width L2=0.5 mm, as shown in Table 1. A relationship of H+t=T was obtained and a relationship of H≧W2, H>t, and L1+L2>W2 was satisfied, but a relationship of H+t>T was not satisfied and the upper base width W1 was smaller than a focal spot diameter of laser beam. Setting was performed such that the irradiation output of laser beam on the positive electrode side was 600 W, and that on the negative electrode side was 550 W. In a lithium-ion secondary battery 20 in Example 10, an average value of 1 kHz AC impedance was 0.25 mΩ. A plurality of sputters which were thought to be generated at a welding time adhered to a face of the current collecting disk 7 which was irradiated with laser beam, and a blowhole was observed in a section of a welded portion. Further, meltdown was observed in some of aluminum foils and rolled copper foils Regarding the lithium-ion secondary batteries of the respective Examples and Comparative Examples, a joint situation among the current collecting disk, the positive electrode mixture non-application portion 1, and the negative electrode mixture non-application portion 3 will be explained. As shown in Table 1, in the lithium-ion secondary battery of each of Comparative Example 1 and Comparative Example 2, since the sectional shape of the projecting ridge portion does not take on an approximately trapezoidal shape (W1=W2), initial melting occurs on the upper side (the distal end side of the projecting ridge portion) of the projecting ridge portion, but since a proximal end side through which melting propagation occurs is insufficient, a keyhole (a recess to the current collecting disk) is easy to occur in the course of the melting propagation, and a melted body rages. As a result, sputter or blowhole occurs, which will result in meltdown of the aluminum foil or the rolled copper foil abutting on the flat portion of the current collecting disk 7.

On the other hand, in the lithium-ion secondary battery 20 of each of Example 1 and Example 2 using the current collecting disk 7 (see FIG. 5A) where each dimension satisfies the relationship of H>W2 and H>t, the AC impedance was suppressed to a low value. It is estimated from such a fact that since irradiation energy of laser beam initially concentrates on the projecting ridge portion 8 to run through the whole projecting ridge portion, it is used for welding efficiently. In the lithium-ion secondary battery 20 of each of Example 3 and Example 6, since nickel different from the material for the negative current collector was used as the material for the current collecting disk 7 on the negative electrode side, such a tendency that the AC impedance slightly increased was confirmed. It is thought that alloy of nickel and copper is formed at the welded portion. However, nickel and copper are totally solid-dissolved but the specific resistance of the alloy becomes higher than that of each of nickel and copper alone, which will result in increase of the AC impedance. Though welding can be performed using a material other than nickel, alloy composition at a welded portion becomes unstable, so that it is difficult to avoid at least influence on strength of the welded portion and the AC impedance.

In the lithium-ion secondary battery 20 of each of Example 4 and Example 5 using the current collecting disk 7 (see FIG. 5B) having the grooves 18a, 18b and the projecting ridge portion 8, where each dimension satisfies the relationship of H≧W2, H>t, H+t>T, and L1+L2≧W2, the AC impedance was suppressed to a low value. This will be because of effective use of irradiation energy of laser beam for welding. On the other hand, in the lithium-ion secondary battery 20 of Example 8, the total sum of the groove widths L1 and L2 is smaller than the lower base width W2 (L1+L2<W2) and the disk thickness on groove t is larger than the projecting height H (H<t). Therefore, since the volumes of the bottom portions of the groove 18a and the groove 18b (portions defined by the disk thickness on groove t and the groove widths L1, L2) become large, namely, the thermal capacities becomes large, melting caused by irradiation energy of laser beam is prevented, which will result in increase of the AC impedance. Irradiation energy running through bottom portions of the grooves 18a, 18b will get scattered, which result in insufficiency of melting. In the lithium-ion secondary battery 20 of Example 7, the projecting height H is smaller than the lower bottom width W2 (H<W2), and the disk thickness on groove t is larger than the projecting height H (H<t). Therefore, the AC impedance will rise like the case of Example 8.

In the lithium-ion secondary battery 20 of each of Example 9 and Example 10, since the upper base width W1 of the projecting ridge portion 8 is smaller than the focal spot diameter of laser beam, energy will get scatter, which will result in blocking of efficient melting of the projecting ridge portion 8. In order to melt the projecting ridge portion 8 efficiently, it was necessary to raise irradiation output of laser beam to the projecting ridge portion 8, which resulted in occurrence of the sputter and blowhole. The sputter may generate a possibility of mixing of foreign material into the battery, and the blowhole may generate a possibility of lowering strength of a welded portion.

(Operation and the Like)

Next, Operation and the like of the lithium-ion secondary battery 20 of the embodiment will be explained.

In the embodiment, the current collecting disks 7 are disposed so as to face both the end faces of the winding group 6, and the end portion of the positive electrode mixture non-application portion 1 and the end portion of the negative electrode mixture non-application portion 3 are joined to faces of the current collecting disks 7 facing the winding group 6 at a plurality of joint portions, respectively. Since the plurality of joint portions is formed, the number of current collecting paths is increased, so that the internal resistance can be reduced. In the embodiment, the current collecting disk 7 has the flat face portions on its face on the side of the winding group 6 and the plurality of projecting ridge portions on its face opposite to the winding group 6. Therefore, since the current collecting disks 7, and each of the positive electrode mixture non-application portion 1 and the negative electrode mixture non-application portion 3 is joined to each other by causing the end portion of the positive electrode mixture non-application portion 1 and the end portion of the negative electrode mixture non-application portion 3 to abut on the flat face portions of the current collecting disks 7 and melting the projecting ridge portion 8 by laser welding to cause the melted portion to project (grow down) from the flat face portion, joining is achieved without damaging the positive electrode mixture non-application portion 1 and the negative electrode mixture non-application portion 3 so that internal resistance can be suppressed to a small value. Since the widths of the positive electrode plate 2 and the negative electrode plate 4 are approximately uniform, the end edges of the positive electrode mixture non-application portion 1 and the negative electrode mixture non-application portion 3 projecting from both end faces of the winding group 6, respectively, are aligned in a flat face manner so that joining can be achieved securely by causing the end edge to the flat face portion of the current collecting disk 7.

In the embodiment, the projecting ridge portion 8 and a portion of the current collecting disk 7 are melted and the melted portion grows down from the lower face of the current collecting disk 7 so that the current collecting disk 7 and each of the positive electrode mixture non-application portion 1 and the negative electrode mixture non-application portion 3 are joined to each other. Therefore, even if a difference in thickness between each of the positive electrode mixture non-application portion 1 and the negative electrode mixture non-application portion 3 and the current collecting disk 7 is excessively large (both of the thickness of the positive electrode mixture non-application portion 1 and the thickness of the negative electrode mixture non-application portion 3 is 20 µm, while the thickness of current collecting disk 7 is in a range of 0.2 to 1.6 mm), joining can be achieved in an electrically low resistance state (see Table 1).

Further, in the embodiment, the current collecting disk 7 includes the projecting ridge portions 8 disposed thereon radially, and each of the positive electrode mixture non-application portion 1 and the negative electrode mixture non-application portion 3 is joined to the current collecting disk 7 by irradiation of laser beam to the projecting ridge portions 8. Since joining is performed by scanning laser beam linearly along each projecting ridge portion 8, joining can be achieved easily. The projecting ridge portion 8 and a portion of the current collecting disk 7 melted at a laser welding time grow down toward the winding group 6 so that the melted portion further grows down along each of the positive electrode mixture non-application portion 1 and the negative electrode mixture non-application portion 3 to facilitate joining.

In addition, in the embodiment, the projecting ridge portion 8 takes on an approximately trapezoidal shape in section, and such setting is performed that, when the projecting height is represented as H, the lower base width is represented as W2, and the thickness of the current collecting member is represented as t, the dimension of the projecting ridge portion 8 satisfies a relationship of H≧W2 and H>t (Examples 1, 2, 3, 7, and 9). Therefore, since a size of a melted portion growing down from the lower face of the current collecting disk 7 at a laser welding time can be adjusted, the melted portion does not contact with the separator 5 and conduction of heat generated from laser welding to the separator 5 becomes hard, so that melting damage of the separator 5 can be prevented. Since the melted portion has a sufficient size for joining, the current collecting disk 7 and each of the positive electrode mixture non-application portion 1 and the negative electrode mixture non-application portion 3 can be joined to each other securely. Since the melted portion growing down is small in the case of H<W2, and even if the projecting ridge portion 8 melts at a time of H≦t, the thickness t is large, so that sufficient melting can be obtained, the melted portion becomes difficult to grow down from the lower face of the current collecting disk 7. As a result, joining between the current collecting disk 7 and each of the positive electrode mixture non-application portion 1 and the negative electrode mixture non-application portion 3 may become insufficient.

In the embodiment, the example where the grooves 18a, 18b are formed on both sides of the projecting ridge portion 8 (Examples 4, 5, 6, 8, and 10). In the current collecting disk 7, setting is performed such that, when the projecting height is represented as H, the lower base width is represented as W2, the thickness of the current collecting disk 7 is represented as T, the disk thickness where each of the grooves 18a, 18b is formed is represented as t, the groove width of the groove 18a is represented as L1, and the groove width of the groove 18b is represented as L2, the dimensions of the grooves 18a, 18b and the projecting ridge portion 8 satisfy the relationship of H≧W2, H>t, H+t>T and L1+L2≧W2. Therefore, a portion of the current collecting disk 7 where the projecting ridge portion 8 and the grooves 18a, 18b are formed melts and the melted portion grows down toward the winding group 6 at a laser welding time without causing dissipation of irradiation energy. Thereby, each of the positive electrode mixture non-application portion 1 and the negative electrode mixture non-application portion 3 can be joined to the current collecting disk 7 securely. The melted portion growing down is reduced in the case of H<W2, and even if the projecting ridge portion 8 melts in the case of H≦t, the melted portion become hard to grow down. Since the position of the upper face of the projecting ridge portion 8 becomes lower than the position of the upper face of the current collecting disk 7 in the case of H+t≦T, irradiation of laser beam from above the projecting ridge portion 8 becomes hard, which results in difficulty of sufficient melting of the projecting ridge portion 8. Dissipation of irradiation energy of laser beams may occur in the case of L1+L2<W2. As a result, joining between the current collecting disk 7 and each of the positive electrode mixture non-application portion 1 and the negative electrode mixture non-application portion 3 may be insufficient.

In the embodiment, the materials for the current collecting disks 7 on both of the positive electrode side and the negative electrode side are set to the same materials as those for the positive electrode mixture non-application portion 1 and the negative electrode mixture non-application portion 3 to be joined. Therefore, since the same materials are joined to each other at a laser welding time, improvement of joint strength can be achieved. In the embodiment, the upper base width W1 of the projecting ridge portion 8 (the width of the distal end portion) is set to be larger than the focal spot diameter of laser beam. Therefore, since energy of irradiated laser beam is effectively utilized for melting of the projecting ridge portion 8, joining can be achieved without causing welding defect such as sputter or blowhole.

In the embodiment, the electrode mixture non-application portion 1 and the negative electrode mixture non-application portion 3 are joined to the faces of the current collecting disk 7 facing the winding group 6 on both of the positive electrode side and the negative electrode side. Therefore, a working time or an attaching time required in such a case that respective foils configuring the positive electrode plate and the negative electrode plate are worked to strip comb shapes or current collecting tabs are attached to the foils is not required in the embodiment, manufacturing efficiency can be improved without lowering material yield such as necessity of discarding margin of foils. As compared with a case of winding a positive electrode plate and a negative electrode plate which are worked to strip comb shapes or are attached with current collecting tabs, the positive electrode plate, the negative electrode plate, and the separator are prevented from being wound in a state that current collecting tabs have been bitten into the positive electrode plate, the negative electrode plate, or the separator at a manufacturing time of the winding group 6, so that a possibility of such a step trouble that insulation between the positive electrode plat and the negative electrode plate is impaired can be completely eliminated. Further, current collecting tabs or the like are gathered so as to cover the end face of the winding group and joined to a side edge of the current collecting disk. In the embodiment, however, since the positive electrode mixture non-application portion 1 and the negative electrode mixture non-application portion 3 do not over the end face of the winding group 6 and the slits 9 are formed in the current collecting disk 7, flow paths of nonaqueous electrolyte to the winding group 6 can be secure. Thereby, a time required for nonaqueous electrolyte to flow in the winding group 6 can be reduced and such a factor as leading to increase of preparing lead time can be completely eliminated.

As explained above, it has been found that, by adjusting the dimensions of the projecting ridge portion 8 or the grooves 18*a*, 18 formed on the current collecting disk 7 and irradiation output for laser welding, joining between the current collecting disk 7 and each of the positive electrode mixture non-application portion 1 and the negative electrode mixture non-application portion 3 can be made easy, so that the AC impedance can be reduced. By adopting the current collecting structure using the current collecting disks 7, a possibility of causing internal short-circuiting or voltage drop can be eliminated, so that a lithium-ion secondary battery 20 with high performance and high reliability can be obtained. In such a lithium-ion secondary battery 20, since reduction of internal resistance, and further improvement of performance quality and reliability, or reduction of cost or preparing lead time considering industrial mass production can be achieved, the lithium-ion secondary battery 20 can be properly used in application with a high-rate orientation such as an electric power tool coping with large current charging/discharging or the like. The present invention is increasingly expected for large contribution to global industrial field for conservation of global environment as a power source for an electric vehicle, a hybrid vehicle, or the like.

Incidentally, in the embodiment, the example of the winding group 6 obtained by winding the positive electrode plate 2 and the negative electrode plate 4 as the electrode body has been shown, but the present invention is not limited to the example, and a laminated electrode group obtained by laminating rectangular or circular positive electrode plate and negative electrode plate via a separator may be adopted. In the embodiment, the example where the current collecting disks 7 are arranged on both of the positive electrode side and the negative electrode side has been shown, but the present invention is not limited to this example. For example, such a configuration can be adopted that the end portion of the negative electrode mixture non-application portion 3 is directly joined to an inner bottom face of the battery container 10 by laser welding without disposing the current collecting disk 7 on the negative electrode side, for example. Such a configuration can be realized by using the same material as that for the negative electrode current collector as the material for the battery container 10 and providing projecting ridge portions 8 similar to the projecting ridge portions 8 of the current collecting disk 7 on an outer bottom face of the battery container 10. In the embodiment, the example where the battery container 10 also serves as the negative electrode external terminal and the upper lid 11 also serves as the positive electrode external terminal has been shown, but the present invention is not limited to the example, and such a configuration can be adopted that the battery container 10 serves as the positive electrode external terminal and the upper lid 11 serves as the negative electrode external terminal.

Figure 7A:
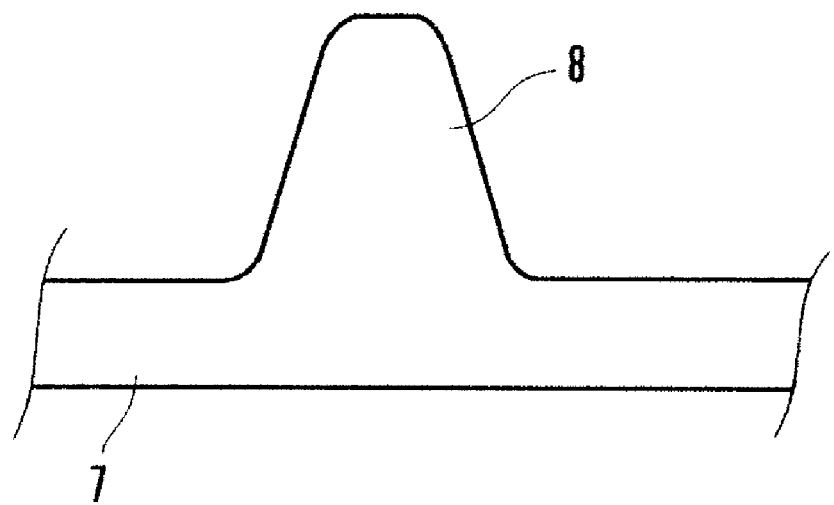
FIGS. 7A and 7B are sectional views showing shapes of projecting ridge portions of current collecting disks according to different aspects, FIG. 7A showing a projecting ridge portion which has been subjected to chamfering work and FIG. 7B showing a projecting ridge portion which has been subjected to a chamfering work and a pair of grooves formed on both sides of a projecting ridge portion, which have been subjected to chamfering work.
Figure 7B:
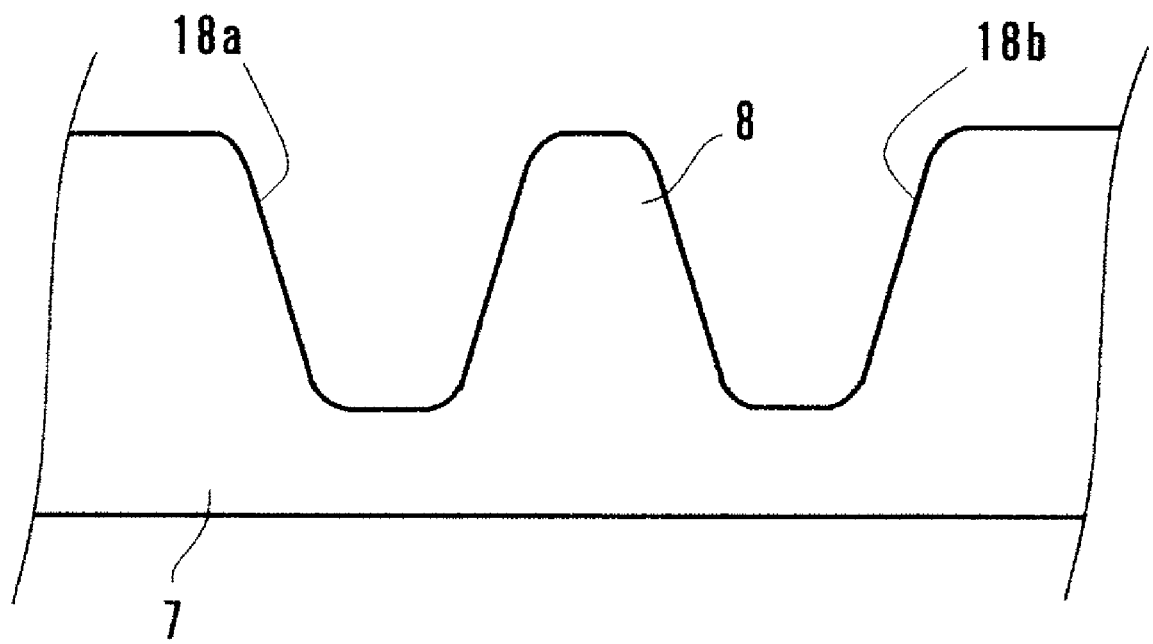

In the embodiment, the example where the projecting ridge portion 8 is formed in an approximately trapezoidal shape in section, but the present invention is not limited to this example and corner portions of the projecting ridge portion 8 may be chamfered in a rounding manner. For example, as shown in FIGS. 7A and 7B, chamfering work can be applied to corner portions of the projecting ridge portion 8 on its upper face side or corner portions of the grooves 18*a*, 18*b*. However, an effect of the present invention is not influenced by presence/absence of chamfer work. When the projecting ridge portion 8 or the grooves 18*a*, 18*b* are formed in a manufacturing process of the current collecting disk 7, it is possible to conduct not only cutting work but also pressing work.

In the embodiment, the example of using the current collecting plate 7 as the current collecting member has been shown, but the current collecting member of the present invention is not limited to the disk-like current collecting member, and the current collecting member used in the present invention is only required to have the projecting ridge portion 8. For example, when the laminated electrode group is used, a rectangular current collecting member may be used. In the embodiment, the example where the projecting ridge portions 8 are radially formed on the current collecting disk 7 has been shown, but the present invention is not limited to this example, and a plurality of projecting ridge portions may be formed in a curved manner such as an involute curve, for example. It is possible to combine straight projecting ridge portions and curved projecting ridge portions. Further, the number of straight projecting ridge portions and curved projecting ridge portions can not be limited to specific ones. It is unnecessary to dispose all radial projecting ridge portions so as to extend from a central portion of the current collecting disk 7 toward the outer peripheral edge portion. For example, some of the projecting ridge portions can be disposed so as to extend from an intermediate portion of the current collecting disk 7 toward the outer peripheral edge portion.

Further, in the embodiment, though not pointed specifically, the present invention is not limited to a laser apparatus used for laser welding which emits laser beam to the projecting ridge portion 8. For example, a fiber laser apparatus, a pulse YAG laser apparatus, or the like can be used as the laser apparatus, and the effect obtained by the present invention is not influenced by an apparatus or a system to be used.

Furthermore, in the embodiment, the example where the positive electrode plate 2 and the negative electrode plate 4 are configured by applying positive electrode mixture and negative electrode mixture to both faces of the aluminum foil and the rolled copper foil has been shown, but the present invention is not limited to this example. For example, regarding portions of the positive electrode mixture application portion and the negative electrode mixture application portion in the winding group 6 which are not opposed to each other, an application portion may be partially formed on only one face. The shape and the size of the battery are not limited to specific ones, of course.

INDUSTRIAL APPLICABILITY

Since the present invention provides a lithium-ion secondary battery where a current collecting member and a foil are joined to each other securely while damage of the foil is suppressed, it contributes to manufacture and sales of a lithium-ion secondary battery, so that the present invention has an industrial applicability.

What is claimed is:

1. A lithium-ion secondary battery which is provided with an electrode group where a positive electrode plate obtained by applying positive electrode mixture mainly including positive electrode active material to a foil and a negative electrode plate obtained by applying negative electrode mixture mainly including negative electrode active material to a foil are disposed so as to sandwich a separator, where an end portion of the foil of at least one of the positive electrode plate and the negative electrode plate projects from an end face of the electrode group, a current collecting member for collecting current from the foil of said at least one of the positive and negative electrode plate is disposed so as to face the end face of the electrode group, and a joint portion obtained by joining the current collecting member and an end portion of the foil is formed so as to project from a face of the current collecting member which faces the electrode group, wherein the current collecting member, which has a disc-like shape which is the same shape as the end face of the electrode group, includes a plurality of projecting ridge portions with an approximately trapezoidal shape in section extending from a central portion of the current collecting member toward an outer edge portion thereof on a face thereof positioned on a side opposite to the electrode group, the current collecting member further having flat portions facing the electrode group which are provided at positions corresponding to the projecting ridge portions, wherein the joint portion between the end portion of the foil and the flat portions is formed from melted ridge portions that project from the flat portions into the end portion of the foil.

2. The lithium-ion secondary battery according to claim 1, wherein the projecting ridge portion is provided so as to extend in a straight line or in a curved line.

3. The lithium-ion secondary battery according to claim 2, wherein the current collecting member is formed with a pair of grooves extending along both sides of the projecting ridge portion.

4. The lithium-ion secondary battery according to claim 3, wherein, when a projecting height of the projecting ridge portion is represented as H, a width of a base portion of the projecting ridge portion is represented as W2, a thickness of the current collecting member is represented as T, a thickness of a portion of the current collecting member where the groove is formed is t, and groove widths of the pair of grooves are represented as L1 and L2, the current collecting member satisfies $H \geq W2$, $H > t$, $H+t > T$, and $L1+L2 > W2$.

5. The lithium-ion secondary battery according to claim 1, wherein, when a projecting height of the projecting ridge portion is represented as H, a width of a base portion of the projecting ridge portion is represented as W2, and a thickness of the current collecting member is represented as t, the current collecting member satisfies a relationship of $H \geq W2$ and $H > t$.

6. The lithium-ion secondary battery according to claim 1, wherein material for the current collecting member is the same material as that for a foil joined to the current collecting member.

7. The lithium-ion secondary battery according to claim 1, wherein, the joint portion is formed by irradiating the projecting ridge portion with laser beam.

8. The lithium-ion secondary battery according to claim 7, wherein, a width of a distal end portion of the projecting ridge portion is larger than a focal spot diameter of the laser spot on the current collecting member.

9. The lithium-ion secondary battery according to claim 7, wherein the joint portion is integrated by melting an end portion of the foil into a melted portion obtained by melting the projecting ridge portion and a portion of the current collecting member by irradiation of the laser beam.

10. The lithium-ion secondary battery according to claim 1, wherein said foil whose end portion projects from an end face of the electrode group is formed on a side edge thereof with a non-application portion of the positive electrode mixture or the negative electrode mixture, at least one portion of the non-application portion projects from an end edge of the separator, and an end portion of the non-application portion projects from the end face of the electrode group.

11. The lithium-ion secondary battery according to claim 1, wherein the end portions of the foil of the positive electrode plate and the negative electrode plate are uniformly spaced apart along said joint portion in a direction between said central portion of the current collecting member and said outer edge portion of said flat face.

12. A lithium-ion secondary battery which is provided with an electrode group where a positive electrode plate obtained by applying positive electrode mixture mainly including positive electrode active material to a foil and a negative electrode plate obtained by applying negative electrode mixture mainly including negative electrode active material to a foil are disposed so as to sandwich a separator, where an end portion of the foil of at least one of the positive electrode plate and the negative electrode plate projects from an end face of the electrode group, a current collecting member for collecting current from the foil of said at least one of the positive and negative electrode plate is disposed so as to face the end face of the electrode group, and a joint portion obtained by joining the current collecting member and an end portion of the foil is formed so as to project from a face of the current collecting member which faces the electrode group, wherein the current collecting member, which has the same shape as the end face of the electrode group, includes a plurality of projecting ridge portions extending from a central portion of the current collecting member toward an outer edge portion thereof on a flat face thereof positioned on a side opposite to the electrode group, the current collecting member further having flat portions on an opposing face that are parallel to said flat face facing the electrode group which are provided at positions corresponding to the projecting ridge portions, wherein the joint portion between the end portion of the foil and the flat portions is formed from melted ridge portions that project from the flat portions into the end portion of the foil.

* * * * *